United States Patent [19]

Salin

[11] Patent Number: 5,400,390
[45] Date of Patent: Mar. 21, 1995

[54] METHOD FOR ESTABLISHING AN INBOUND CALL TO THE MOBILE TELEPHONE IN A GSM CELLULAR MOBILE TELEPHONE NETWORK

[75] Inventor: Hannu P. Salin, Vantaa, Finland

[73] Assignee: Nokia Telecommunications OY, Espoo, Finland

[21] Appl. No.: 971,763

[22] PCT Filed: Jun. 3, 1992

[86] PCT No.: PCT/FI92/00174

§ 371 Date: Mar. 9, 1993

§ 102(e) Date: Mar. 9, 1993

[87] PCT Pub. No.: WO92/22174

PCT Pub. Date: Dec. 10, 1992

[30] Foreign Application Priority Data

Jun. 6, 1991 [FI] Finland ................................ 912737

[51] Int. Cl.$^6$ ...................... H04M 11/00; H04L 9/00; H04Q 7/00
[52] U.S. Cl. ........................................ 379/59; 379/57; 379/58; 379/60; 380/21; 455/34.1
[58] Field of Search ........................ 379/56, 58, 57, 59, 379/60, 61; 380/21; 455/33.1, 34.1, 77

[56] References Cited

U.S. PATENT DOCUMENTS

| 3,663,762 | 5/1972 | Joel, Jr. ............................... | 379/60 |
|---|---|---|---|
| 5,123,111 | 6/1992 | Delory et al. ...................... | 455/34.1 |
| 5,241,598 | 8/1993 | Raith .................................... | 380/21 |
| 5,278,890 | 1/1994 | Beeson, Jr. et al. .................. | 379/57 |
| 5,282,240 | 1/1994 | Buhl et al. .............................. | 379/59 |

FOREIGN PATENT DOCUMENTS

| 454647 | 10/1991 | European Pat. Off. . | |
|---|---|---|---|
| 0456547 | 11/1991 | European Pat. Off. .............. | 379/58 |
| 3926305 | 2/1991 | Germany . | |

OTHER PUBLICATIONS

Delory, Treillard, "Securty and Saturation Solutions for GSM" Telephone Engineer and Management, Jan. 16, 1991.

European Telecommunications Standards Institute "Vocabulary in a GSM PLMN" Jan. 23, 1990.

Ericsson, "Advanced Intelligent Network", 1992.

Thomas, Mouly, Gilbert, "Performance Evaluation of the Chanel Organization of the European Digital Mobile Communication System" IEEE Sep. 1988.

Ballard, Issenmann, Sanchez, "Cellular Mobile Radio as an Intelligent Network Application" Electrical Communication, V. 63 #4, 1989.

Weib, Wizgall, "System 900: The ISDN Approach to Cellular Mobile Radio" Electrical Communication. V. 63 #4, 1989.

Primary Examiner—Curtis Kuntz
Assistant Examiner—William Cumming
Attorney, Agent, or Firm—Cushman Darby & Cushman

[57] ABSTRACT

A method for setting up an inbound call to a mobile telephone MS in a cellular mobile telephone network. In the method, a mobile switching center (MSC) requests a home location register (HLR) to provide call routing information, the home location register (HLR) in turn requesting routing information from the visitor location register (VLR) within the location area of which the mobile telephone is currently located, and forwards the received roaming number to the switching center (MSC) for routing the call to the switching center of the current location area and further to the called mobile telephone. To avoid superfluous signalling, when the HLR detects a call transfer operation activated for a respective MS to a call transfer number, the HLR initiates independently a new roaming number request with this call transfer number at least in the case that the call transfer number belongs to another MS in the same HLR.

6 Claims, 3 Drawing Sheets

METHOD FOR ESTABLISHING AN INBOUND CALL TO THE MOBILE TELEPHONE IN A GSM CELLULAR MOBILE TELEPHONE NETWORK

BACKGROUND OF THE INVENTION

The invention relates to a method for setting up an inbound call to a mobile telephone in a cellular mobile telephone network comprising a home location register for permanently storing location and subscriber data on mobile telephones registered with the network, the geographic coverage area of the network being divided into smaller location areas each comprising a mobile switching centre and a visitor location register for temporarily storing subscriber data on mobile telephones currently located within said location area, the geographic coverage area of each location area being further divided into radio cells each comprising at least one fixed radio station capable of establishing a radio link with the active mobile telephones currently located in the radio cell, in which method a first mobile switching centre receives the subscriber number of a mobile phone and requests the home location register to provide call routing information, and the home location register in turn requests a roaming number from the visitor location register within the location area of which the mobile telephone is currently located, and forwards the received roaming number to the first mobile switching centre for routing the call to the switching centre of the current location area and further to the desired mobile telephone.

Various cellular radio or mobile telephone systems are presently in use or being developed in which the geographic coverage area of the system is divided into smaller separate radio areas or cells in such a way that when the radio or mobile telephone is in a cell, it communicates with a fixed network through a fixed radio station located in the cell. Mobile telephones belonging to the system are free to travel from one cell to another within the area of the system. One such system is the digital mobile telephone system GSM (Groupe Spécial Mobile). When a subscriber within the same system or within an external system wishes to call a mobile subscriber (Mobile Station=MS) within this system, the fixed network must have information on the actual location of the mobile telephone MS in order to be able to route the call to the appropriate mobile services switching centre MSC. In the GSM system, for example, the number dialed by a calling subscriber contains no information on the actual location of the called MS. Therefore, to set up a complete connection, it is necessary to determine the location of the MS and the routing address, i.e. the mobile station roaming number, used for this purpose. In the GSM system, this information can be provided solely by the home location register (=HLR), which is a database in which subscriber data, such as location data, are permanently stored. Therefore, in order for it to be possible to route the call to the MSC within the area of which the MS is currently located, it is necessary to institute a query to the HLR.

In the GSM system, each location area consisting of a plurality of radio cells comprises a visitor location register VLR, which is a database in which a subscriber as well as data on the subscriber are stored while the subscriber visits the area of the VLR. The VLR provides the HLR with the information required for routing calls to the MS and participates in the switching of calls in the MSC, for instance.

There are two alternative modes of giving the routing information, i.e. a routing number. In the first mode, the roaming number can be provided when the VLR updates the location of the subscriber, and the roaming number can be stored in the HLR. In this case, the HLR returns the stored roaming number without further procedures when it receives a routing information query.

In the alternative mode, the HLR may request the VLR within the area of which the MS is currently located to provide a roaming number assigned exclusively to this call, when requested by a gateway MSC or one of the MSCs. The HLR forwards the roaming number provided by the VLR to the requesting MSC which routes the call to the appropriate MSC on the basis of the roaming number. After the call has been routed up to the MSC, the MSC initiates a mobile telephone paging procedure in its location area to find the radio cell and the fixed radio station within the area of which the MS is located. After having found the MS, the MSC establishes a radio link with the MS by means of this fixed radio station and sets up a speech connection.

If the VLR contains data indicating that the pertinent MS is currently inactive (for instance subscriber terminal turned off), the VLR forwards said information to the HLR. If the MS subscriber has activated a call transfer service to another telephone number, the HLR sends this call transfer number to the requesting MSC. The MSC thereafter institutes a query to the HLR whose subscriber has the call transfer number.

SUMMARY OF THE INVENTION

It is the object of the invention to expedite the call setup procedure in this type of cellular mobile telephone system.

This is achieved by a method of the type set forth in the opening paragraph, which is characterized in accordance with the invention in that upon detecting that the said mobile telephone has activated a call transfer operation to a call transfer number, the home location register initiates independently a new roaming number request at least in the case that the call transfer number belongs to another mobile telephone in the same home location register.

As stated previously, the HLR requests the pertinent VLR for a roaming number in systems where a roaming number is assigned separately to each call. If in consequence the need arises to effect a call transfer operation, in the prior art systems the HLR always transmits a call transfer number (the number of another subscriber) to the MSC requesting routing information. This MSC again sends a new routing information request to the HLR to which the other subscriber belongs. This known procedure creates situations where both the initial and the other subscriber belong to the same HLR and the new routing information request is returned to the same HLR that now requests a roaming number for the other subscriber from one of its VLRs.

In the invention, the call transfer number is not sent immediately to the MSC, but the subsequent roaming number request is initiated independently by the HLR either in the case of all call transfer operations or at least when the call is to be transferred to another subscriber of the same HLR. This avoids superfluous signalling caused by the routing of the call transfer number via the MSC, and expedites the setup procedure for the inbound call, which is reflected in a shortened wait time for the calling subscriber.

As stated earlier, a roaming number may be assigned to a subscriber in advance and stored in the data file of the HLR in some systems. When this is the case, upon receiving a routing information request the HLR sends this roaming number as an acknowledgement without any roaming number request to the VLR. In a system of this kind, the invention can be implemented in such a way that upon the HLR detecting that there is a call transfer operation activated for the pertinent MS to a call transfer number, the HLR immediately searches independently from its data file the roaming number assigned previously to the call transfer number at least in the case that the call transfer number belongs to another MS in the same HLR.

DESCRIPTION OF THE DRAWINGS

The invention will now be described in closer detail by means of illustrating embodiments with reference to the accompanying drawings, in which.

DETAILED DESCRIPTION

In the following, the method according to the invention will be explained in conjunction with the digital GSM mobile telephone system, which, in fact, is the primary field of application of the invention. However, the method according to the invention may also be applied in other similar mobile telephone systems or modifications of the GSM system. The basic configuration and operation of the GSM mobile telephone system are well known to those skilled in the art and are relatively precisely determined in the GSM system specifications. Hereinbelow some of the basic concepts and elements of the GSM system, significant for the description of the invention, will be defined with reference to FIG. 1. An area within which GSM mobile telephone services are available is called a GSM network (GSM service area) and may cover several countries. The GSM network may be divided into national GSM networks (PLMN service area), which means the area of one operator providing GSM services. There may also be several GSM networks in one country, and their coverage areas may overlap geographically. In the following exposition, the mobile telephone system refers mainly to such a "national" mobile telephone network which may communicate with other national mobile telephone networks or other telecommunication systems, such as a public switched telephone network.

The national GSM network may comprise one or more MSC service areas, which means an area in which a single mobile services switching centre (MSC) provides services. The MSC service area may further be divided into one or more location areas, a location area being an area covered by several radio cells. A cell refers to the smallest geographic area of the system, comprising one or more fixed radio stations or base stations and utilizing predetermined traffic channels.

The national GSM network usually contains one home location register HLR, which is a database in which mobile telephone data, such as location data, are stored permanently. The system further comprises one or more visitor location registers VLR for each MSC service area. The VLR is a database in which mobile telephone data are stored while the mobile telephone visits the area of the VLR. The VLR has information on the location of the mobile telephone MS with an accuracy of one location area. The HLR in turn has information on the VLR which the mobile telephone MS visits, and provides routing information to the telephone network for calls terminating in the mobile telephone MS. The HLR in turn obtains the required routing information from the VLR. The HLR and the VLR have solely a signalling connection with the other components of the mobile telephone network.

Figure 1:
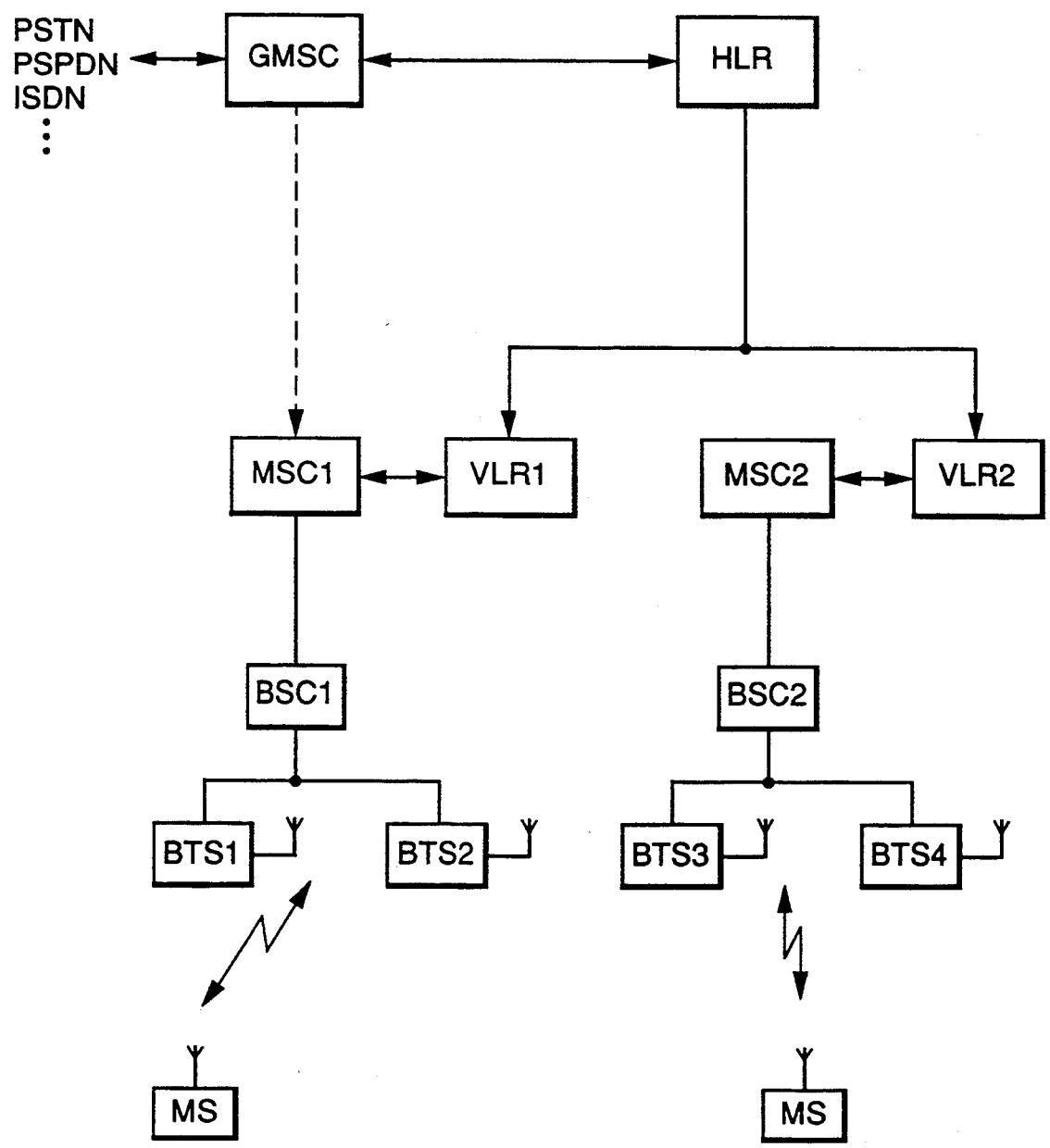
FIG. 1 illustrates schematically a cellular mobile telephone system in which the method according to the invention can be implemented.

The method according to the invention will be described for simplicity as applied in a system shown in FIG. 1, in which each MSC service area has its own visitor location register VLR integrated with the radio or mobile switching centre MSC of that particular service area. FIG. 1 illustrates two MSC service areas, one having a mobile switching centre MSC1 and a visitor location register VLR1, and the other having a mobile switching centre MSC2 and a visitor location register VLR2. Under the two service areas, there are one or more location areas, the traffic within each location area being controlled by a base station controller BSC controlling several fixed radio stations or base transceiver stations BTS. Each radio cell referred to above contains one base station BTS, and one base station controller BSC serves several cells. A mobile telephone MS located in a cell establishes a duplex radio link with the BTS of this particular cell. A signalling connection as well as voice channels are provided between the base station controller BSC and the MSC.

In FIG. 1, the unit MSC1 controls a base station controller BSC1, which in turn controls base stations BTS1 and BTS2. Correspondingly, within the other service area the MSC2 has control over a location area comprising a base station controller BSC2 and base stations BTS3 and BTS4.

In general, the GSM network communicates with other networks, such as a public switched telephone network (PSTN), another mobile telephone network (PSPDN) or an ISDN network, through a specific mobile switching centre called a gateway MSC. One or several (all) of the MSCs of the network may serve as a gateway MSC (GMSC). It is possible to establish a voice channel connection from the gateway MSC (GMSC) to any other MSC of the network. The gateway MSC (GMSC) further has a signalling connection with the home location register HLR. The HLR in turn has a signalling connection with the visitor location registers VLR. Alternatively, the switching centre of another data transmission system, such as an ISDN centre, may serve as the gateway MSC.

Figure 2:
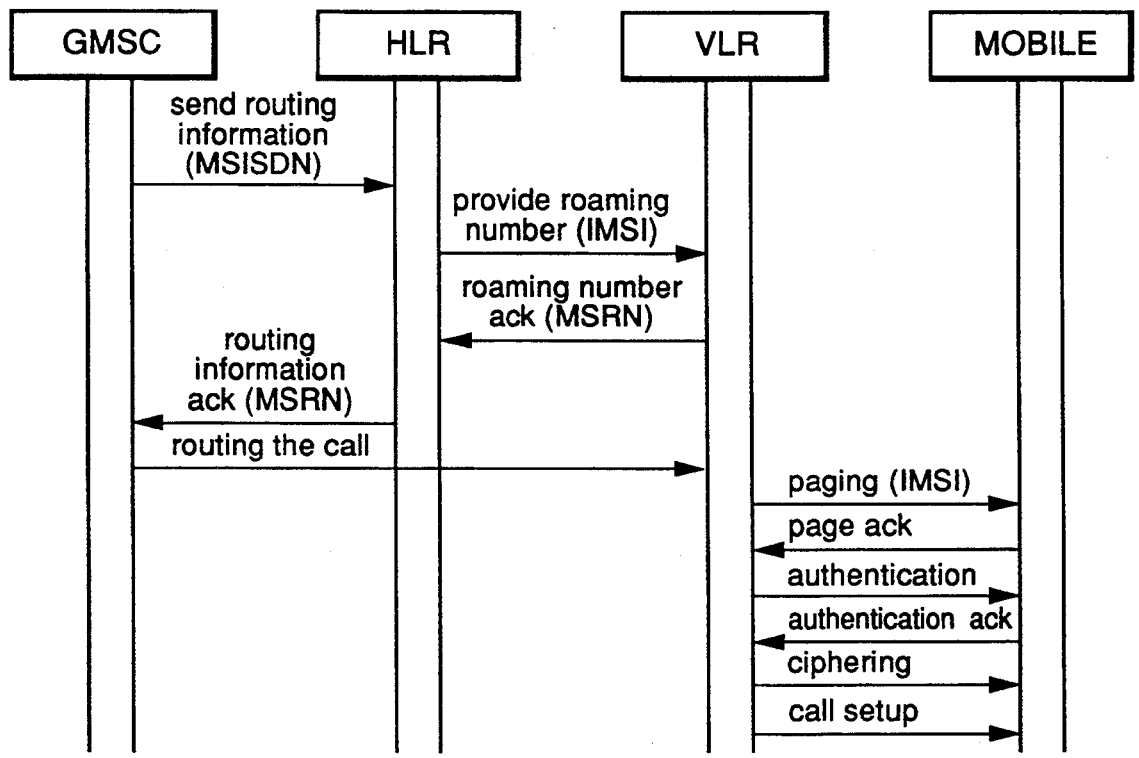
FIG. 2 is a signalling diagram illustrating a known call setup procedure.

FIG. 2 shows a signalling diagram in which the setup of an inbound call is performed in compliance with the GSM recommendation. The MSC, in this case the gateway MSC (GMSC), receives an international telephone number of a mobile telephone MS (international ISDN number) from another network, and forwards it to the home location register of the mobile telephone network requesting it to provide routing information. Alternatively, the HLR may also receive the routing information request from the switching centre of another data transmission system, for instance an ISDN centre. The HLR for its part checks from its data file within which visitor location register VLR the mobile telephone MS having this particular ISDN number is currently located, and requests this VLR to provide a roaming number by sending it an international mobile station identifier IMSI used in the mobile telephone network. In FIG. 2, the VLR assigns a roaming number (MSRN) to the mobile telephone MS for this call and sends it to the HLR. The HLR forwards the roaming number MSRN as routing information to the gateway MSC (GMSC) (or to another switching centre MSC that requested it) which, by utilizing this routing information, routes the inbound call to the MSC of the particular VLR, said MSC initiating the paging of the mobile telephone within that location area of its MSC service area in which the mobile telephone should be located, by sending the IMSI identifier of the mobile telephone. On receiving the paging signal, the mobile telephone acknowledges the receipt. The authentication, encryption, and other possible procedures associated with the B subscriber are then carried out in compliance with the GSM specification, and a call is set up between the A subscriber and the mobile telephone MS.

The mobile phone MS can, when desired, activate unconditional or conditional call transfer operations to another telephone. In an unconditional call transfer operation, the inbound call will always be routed to a telephone number stored in the HLR (call transfer number). In a conditional call transfer operation, the call will be routed to a call transfer number stored in the HLR when a certain condition is met, for example the MS has not registered as active (terminal is turned off), the MS does not answer, the MS is busy, etc.

Figure 3:
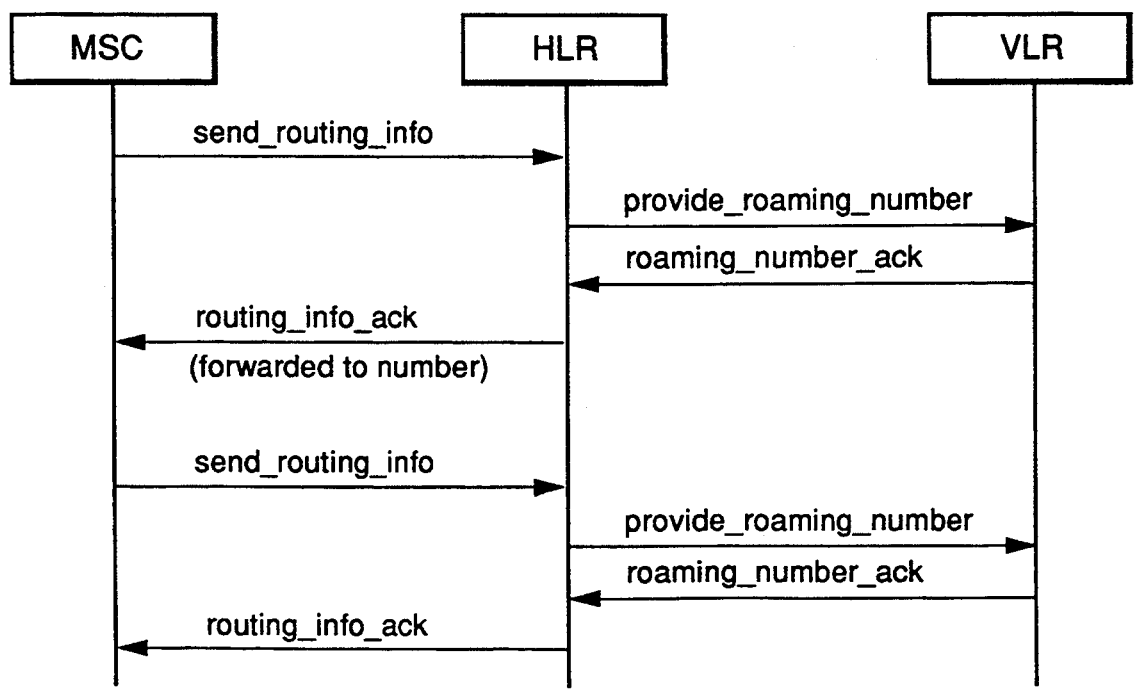
FIG. 3 is a signalling diagram illustrating a prior art call setup procedure when the subscriber has a call transfer operation to another subscriber in the same HLR.

The signalling diagram of FIG. 3 illustrates a routing information request in accordance with the known procedure, when there is a call transfer operation for the called MS to another MS in the same HLR. In a normal situation, when the called MS can be reached and the call transfer operation is not necessary, the entire procedure is continued as in FIG. 2.

When the MS is not accessible, the procedure of FIG. 3 is initially similar as in FIG. 2, so that upon receiving the telephone number of the mobile telephone, one of the MSCs (for instance the GMSC) requests the HLR to provide routing information by sending it the ISDN number of the mobile telephone, in response to which the HLR in turn requests the VLR within the area of which the mobile telephone MS is currently located to provide a roaming number, by sending the IMSI identifier to the VLR. However, in this case the MS is not accessible (for instance, MS is inactive), and thus the VLR forwards information on this to the HLR. The HLR detects (at point X) the fact that the HLR contains a registration of an active call transfer service for the called MS to another telephone number, which will be called a call transfer number hereinafter. The HLR sends this call transfer number as an acknowledgement to the MSC requesting routing information, which again initiates a new routing request by sending the call transfer number back to the same HLR. Thereafter the setup of the call proceeds as in FIG. 2.

Figure 4:
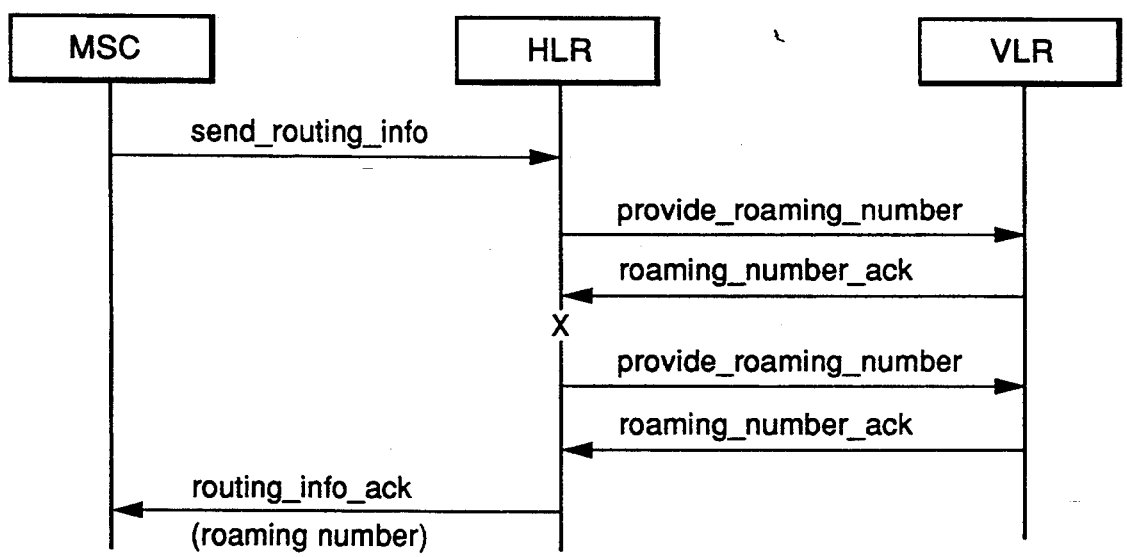
FIG. 4 is a signalling diagram illustrating a call setup procedure in accordance with the invention when the subscriber has a call transfer operation to another subscriber in the same HLR.

The signalling diagram of FIG. 4 illustrates a procedure according to the invention whereby the superfluous signalling between the HLR and the MSC associated with the prior art procedure shown in FIG. 3 is avoided. In FIG. 4, the signalling proceeds similarly as in FIGS. 2 and 3 until the HLR receives information from the VLR that the called MS cannot be reached. When the HLR then detects that the HLR contains an active registration of a call transfer service for the called MS to another telephone number (call transfer number), the HLR does not immediately transmit this call transfer number to the MSC, but always initiates independently a new roaming number request with the call transfer number. If the MS corresponding to the call transfer number is unknown to the HLR, that is, the MS belongs to another HLR, this new roaming number request will automatically fail and no roaming number is obtained, and in that case the HLR sends the call transfer number to the MSC as an acknowledgement. On the other hand, if the call transfer number corresponds to a subscriber MS in the HLR, the HLR succeeds in sending the roaming number request to the VLR within the area of which the MS is located. The VLR returns the roaming number, and the call setup proceeds as in FIG. 2. This solution eliminates the superfluous signalling referred to above, and affects only one operation within the HLR (roaming number request). On the other hand, the drawback consists in that the call forwarding operation always initiates a roaming number request.

In an alternative procedure according to the invention, the HLR always first checks whether the call transfer number is held by another subscriber MS in the same HLR. If the other MS is a subscriber in the same HLR, the HLR initiates independently a new roaming number request with the call transfer number. If the call transfer number is not a number of a subscriber in the same HLR, the HLR does not initiate a new roaming number request but sends the call transfer number to the MSC as an acknowledgement. With this solution, initiation of superfluous roaming number requests is avoided, but on the other hand it affects several operations in the HLR and requires analysis of the call transfer number.

As stated previously, there is another alternative procedure for providing routing information, in addition to the call by call procedure performed by the VLR as above. In this second procedure, a roaming number is assigned to a subscriber whenever the VLR updates the location of the subscriber, and this number is stored with the HLR. Since the roaming number exists with the HLR, the HLR can search the roaming number corresponding to the subscriber number from its subscriber data file and send it to the MSC as an acknowledgement. Thereby the roaming number request addressed to the VLR is omitted. The method of the invention can be implemented in such a system as follows: When upon receipt of a routing information request the HLR detects a call transfer operation activated for said mobile telephone to a call transfer number, the HLR immediately searches independently from its data file the previously assigned and stored roaming number for this call transfer number, at least in the case that the call transfer number belongs to another mobile telephone in the same HLR.

Even though the method according to the invention has been described above specifically in conjunction with the GSM mobile telephone system, it is to be understood that it can also be applied in other mobile telephone systems of the same type, or in modifications of the GSM system. The figures and the description pertaining thereto are also otherwise solely intended to illustrate the present invention. In its details, the method according to the invention may vary within the scope of the attached claims.

I claim:

1. A method for setting up an inbound call to a mobile telephone in a cellular mobile telephone network comprising a home location register for permanently storing location and subscriber data on mobile telephones registered with the network, the geographic coverage area of the network being divided into smaller service areas each comprising a mobile switching centre and a visitor location register for temporarily storing subscriber data on mobile telephones currently located within said service area, the geographic coverage area of each service area being further divided into radio cells each comprising at least one fixed radio station capable of establishing a radio link with the active mobile telephones currently located in the radio cell, in which the method comprises the steps of a mobile switching centre receives the subscriber number of the mobile telephone and requests the home location register to provide call routing information, the home location register requests a roaming number from the visitor location register within the service area of which the mobile telephone is currently located, the home location register receives from the requested visitor location register information that there is a call transfer operation activated for said mobile telephone to a call transfer number, the home location register initiates independently a new roaming number request for said call transfer number, and the home location register forwards the obtained roaming number to said mobile switching centre for call routing of a respective call to a respective mobile telephone.

2. A method for setting up an inbound call to a mobile telephone in a cellular mobile telephone network comprising a home location register for permanently storing location and subscriber data on mobile telephones registered with the network, the geographic coverage area of the network being divided into smaller service areas each comprising a mobile switching centre and a visitor location register for temporarily storing subscriber data on mobile telephones currently located within said service area, the geographic coverage area of each service area being further divided into radio cells each comprising at least one fixed radio station capable of establishing a radio link with the active mobile telephones currently located in the radio cell, in which the method comprises the steps of a mobile switching centre receives the subscriber number of the mobile telephone and requests the home location register to provide call routing information, the home location register requests a roaming number from the visitor location register within the service area of which the mobile telephone is currently located, when the home location register receives, upon requesting a roaming number from the visitor location register, a response that the mobile telephone is inactive, and when the home location register contains a call transfer operation activated for the called mobile telephone to a call transfer number of another mobile telephone not belonging to the same home location register, the home location register sends the call transfer number to said mobile switching centre.

3. A method for setting up an inbound call to a mobile telephone in a cellular mobile telephone network comprising a home location register for permanently storing location and subscriber data on mobile telephones registered with the network, the geographic coverage area of the network being divided into smaller service areas each comprising a mobile switching centre and a visitor location register for temporarily storing subscriber data on mobile telephones currently located within said service area, the geographic coverage area of each service area being further divided into radio cells each comprising at least one fixed radio station capable of establishing a radio link with the active mobile telephones currently located in the radio cell, in which the method comprises the steps of a mobile switching centre receives the subscriber number of the mobile telephone and requests the home location register to provide call routing information, the home location register requests a roaming number from the visitor location register within the service area of which the mobile telephone is currently located, when the home location register receives, upon requesting a roaming number from the visitor location register, a response that the mobile telephone is inactive and when the home location register contains a call transfer operation activated for the called mobile telephone to a call transfer number of another mobile telephone belonging to the same home location register, the home location register requests independently the visitor location register within the location area of which said other mobile telephone is currently located to provide a roaming number of said other mobile telephone, the home location register forwards the obtained roaming number to said mobile switching centre for call routing of a respective call to a respective mobile telephone.

4. A method for setting up an inbound call to a mobile telephone in a cellular mobile telephone network comprising a home location register for permanently storing location and subscriber data on mobile telephones registered with the network, the geographic coverage area of the network being divided into smaller service areas each comprising a mobile switching centre and a visitor location register for temporarily storing subscriber data on mobile telephones currently located within said service area, the geographic coverage area of each service area being further divided into radio cells each comprising at least one fixed radio station capable of establishing a radio link with the active mobile telephones currently located in the radio cell, in which the method comprises the steps of:

a mobile switching centre receives the subscriber number of the mobile telephone and requests the home location register to provide call routing information, the home location register request a roaming number from the visitor location register within the service area of which the mobile telephone is currently located, when the home location register receives, upon requesting a roaming number from the visitor location register, a response that the mobile telephone is inactive, and when the home location register contains a call transfer operation activated for the called mobile telephone to any call transfer number, the home location register always initiates independently a new roaming number request with this call transfer number, in response to which (a) if a roaming number is obtained, the home location register sends it to the mobile switching centre as an acknowledgement, or (b) if the roaming number request fails and no roaming number is obtained, the home location register sends the call transfer number to the mobile switching centre as an acknowledgement.

5. A method for setting up an inbound call to a mobile telephone in a cellular mobile telephone network comprising a home location register for permanently storing location and subscriber data on mobile telephones registered with the network, the geographic coverage area of the network being divided into smaller service areas each comprising a mobile switching centre and a visitor location register for temporarily storing subscriber data on mobile telephones currently located within said service area, the geographic coverage area of each service area being further divided into radio cells each comprising at least one fixed radio station capable of establishing a radio link with the active mobile telephones currently located in the radio cell, in which the method comprises the steps of:

a mobile switching centre receives the subscriber number of the mobile telephone and requests the home location register to provide call routing information, the home location register requests a roaming number from the visitor location register within the service area of which the mobile telephone is currently located, the home location register determines that there is a call transfer operation activated for said mobile telephone to a call transfer number, the home location register immediately searches independently from its data file the roaming number previously assigned and stored for said call transfer number, the home location register forwards the obtained roaming number to said mobile switching centre for call routing of a respective call to a respective mobile telephone.

6. A method for setting up an inbound call to a mobile telephone in a cellular mobile telephone network comprising a home location register for permanently storing location and subscriber data on mobile telephones registered with the network, the geographic coverage area of the network being divided into smaller service areas each comprising a mobile switching centre and a visitor location register for temporarily storing subscriber data on mobile telephones currently located within said service area, the geographic coverage area of each service area being further divided into radio cells each comprising at least one fixed radio station capable of establishing a radio link with the active mobile telephones currently located in the radio cell, in which the method comprises the steps of a mobile switching centre receives the subscriber number of the mobile telephone and requests the home location register to provide call routing information, the home location register requests a roaming number from the visitor location register within the service area of which the mobile telephone is currently located, the home location register determines that there is a call transfer operation activated for said mobile telephone to a call transfer number, the home location register initiates independently a roaming number request for said call transfer number, and the home location register forwards the obtained roaming number to said mobile switching centre for call routing a respective call to a respective mobile telephone.

* * * * *